United States Patent
Lin et al.

(10) Patent No.: US 7,834,571 B2
(45) Date of Patent: Nov. 16, 2010

(54) FAN SYSTEM AND PROTECTING DEVICE THEREOF

(75) Inventors: Yu-Hiuan Lin, Taoyuan Hsien (TW); Chin-Fa Chiu, Taoyuan Hsien (TW); Chun-Lung Chiu, Taoyuan Hsien (TW); Ming-Shi Tsai, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 273 days.

(21) Appl. No.: 11/898,895

(22) Filed: Sep. 17, 2007

(65) Prior Publication Data

US 2008/0075440 A1     Mar. 27, 2008

(30) Foreign Application Priority Data

Sep. 22, 2006    (TW) .............................. 95135071 A

(51) Int. Cl.
  *G05D 23/00*    (2006.01)
(52) U.S. Cl. .................. 318/471; 318/268; 318/400.01; 318/400.21; 318/400.22
(58) Field of Classification Search ................. 318/471, 318/268, 400.01, 400.21, 400.22
See application file for complete search history.

(56) References Cited

U.S. PATENT DOCUMENTS

| | | | | |
|---|---|---|---|---|
| 5,289,089 A | * | 2/1994 | Aoki | 318/400.26 |
| 5,831,405 A | * | 11/1998 | Massie | 318/471 |
| 6,357,667 B1 | * | 3/2002 | Young | 236/49.3 |
| 6,551,065 B2 | * | 4/2003 | Lee | 417/32 |
| 6,768,624 B2 | * | 7/2004 | Miermans | 361/106 |
| 7,091,689 B2 | * | 8/2006 | Lee | 318/400.21 |
| 7,242,562 B2 | * | 7/2007 | Lin et al. | 361/78 |

* cited by examiner

*Primary Examiner*—Walter Benson
*Assistant Examiner*—David S Luo
(74) *Attorney, Agent, or Firm*—Birch, Stewart, Kolasch & Birch, LLP

(57) ABSTRACT

A protecting device of a fan system includes at least one first switch element and at least one control unit. The first switch element receives a first input signal. The control unit is electrically connected with the first switch element, receives the first input signal, and controls the first switch element to turn on or turn off according to the first input signal. The control unit stops outputting the first input signal when the first switch element turns on. The control unit outputs the first input signal when the first switch element turns off, so that a fan of the fan system can be driven by the first input signal.

16 Claims, 7 Drawing Sheets

FAN SYSTEM AND PROTECTING DEVICE THEREOF

CROSS REFERENCE TO RELATED APPLICATIONS

This Non-provisional application claims priority under 35 U.S.C. §119(a) on Patent Application No. 095135071 filed in Taiwan, Republic of China on Sep. 22, 2006, the entire contents of which are hereby incorporated by reference.

BACKGROUND OF THE INVENTION

1. Field of Invention

The invention relates to a system and a protecting device thereof and in particular, to a fan system and a protecting device thereof capable of protecting a motor from damage.

2. Related Art

Referring to FIGS. 1 and 2, a conventional fan system 1 includes a driving device 11, a switch device 12 and a fan motor 13. FIG. 2 shows an equivalent circuit diagram of the fan system 1. The driving device 11 generates a first input signal S1 and a second input signal S2. The first input signal S1 is a pulse signal and can be converted into an inverse pulse signal, which is the second input signal S2, by a switch element 1111 of a phase inverter 111. Accordingly, the second input signal S2 and the first input signal S1 have opposite phases. In addition, the driving device 11 may be a Hall effect IC, and the first input signal S1 and/or the second input signal S2 may be Hall signals. The switch device 12 has two switch elements 121 and 122 for receiving the first and second input signals S1, S2, respectively. The motor 13 has a first coil 131, a second coil 132 and a rotor (not shown). In this example, the motor 13 is a DC brushless motor. The driving device 11 is electrically connected with the switch device 12, and the switch elements 121 and 122 of the switch device 12 are electrically connected with the first hand second coils 131, 132 of the motor 13, respectively. As shown in FIG. 2, the fan system 1 operates as follows. The driving device 11 controls the switch elements 121 and 122 to turn on through the first and second input signals S1, S2, respectively, to alternately drive the first and second coils 131, 132 to produce the electromagnetic induction with the rotor and to make the motor 13 rotate.

When the fan system 1 is influenced by external forces or the internal element is loosened to jam and stop the rotor, the first input signal S1 or the second input signal S2 turns into a high-potential signal.

Because the fan system 1 cannot judge that the motor 13 has stopped rotating, the motor 13 continuously receives the first input signal S1 and the second input signal S2. However, the electric energy received by the motor 13 cannot be converted into the kinetic energy, which is to be released, through the rotor, but is converted into heat to rise the temperature of the motor 13. Thus, the motor 13 may be damaged or burn out due to the overheating, and the reliability and the lifetime of the motor 13 are thus decreased.

Therefore, it is an important subject to provide a fan system and its protecting device capable of protecting the motor from damage when the motor gets abnormal or stops.

SUMMARY OF THE INVENTION

In view of the foregoing, the invention is to provide a fan system and a protecting device thereof capable of protecting a motor from damage when the motor gets abnormal or stops so that the reliability and the lifetime can be enhanced.

To achieve the above, the invention discloses a protecting device of a fan system. The protecting device receives a first input signal and includes at least one first switch element and at least one control unit. The first switch element receives the first input signal. The control unit is electrically connected with the first switch element for receiving the first input signal and controls the first switch element to turn on or turn off according to the first input signal. The control unit stops outputting the first input signal when the first switch element turns on; otherwise, the control unit outputs the first input signal when the first switch element turns off.

In addition, the invention also discloses a fan system including a driving device, a protecting device and a fan motor. The driving device generates a first input signal. The protecting device is electrically connected with the driving device and has at least one first switch element and at least one control unit. The first switch element receives the first input signal. The control unit is electrically connected with the first switch element for receiving the first input signal and controls the first switch element to turn on or turn off according to the first input signal. The motor electrically connected with the protecting device. The control unit stops outputting the first input signal when the first switch element turns on; otherwise, the control unit outputs the first input signal to control the motor to rotate when the first switch element turns off.

As mentioned above, at least one control unit controls at least one first switch element to turn on or turn off according to a first input signal in the fan system and protecting device of the invention. The control unit stops outputting the first input signal to protect the motor when the first switch element turns on. Alternatively, the control unit outputs the first input signal to control the motor to rotate when the first switch element turns off. Compared with the prior art, the protecting device of the invention can control the first switch element to turn on when the motor gets abnormal or stops so that the first input signal is grounded and cannot be outputted to the motor. Thus, it is possible to prevent the motor from being overheated and thus damaged or burn out without decreasing the reliability and the lifetime of the fan system.

BRIEF DESCRIPTION OF THE DRAWINGS

The invention will become more fully understood from the subsequent detailed description and the accompanying drawings, which are given by way of illustration only, and thus are not limitative of the present invention, and wherein.

DETAILED DESCRIPTION OF THE INVENTION

The present invention will be apparent from the following detailed description given hereinafter, which proceeds with reference to the accompanying drawings, wherein the same references relate to the same elements.

Figure 1:
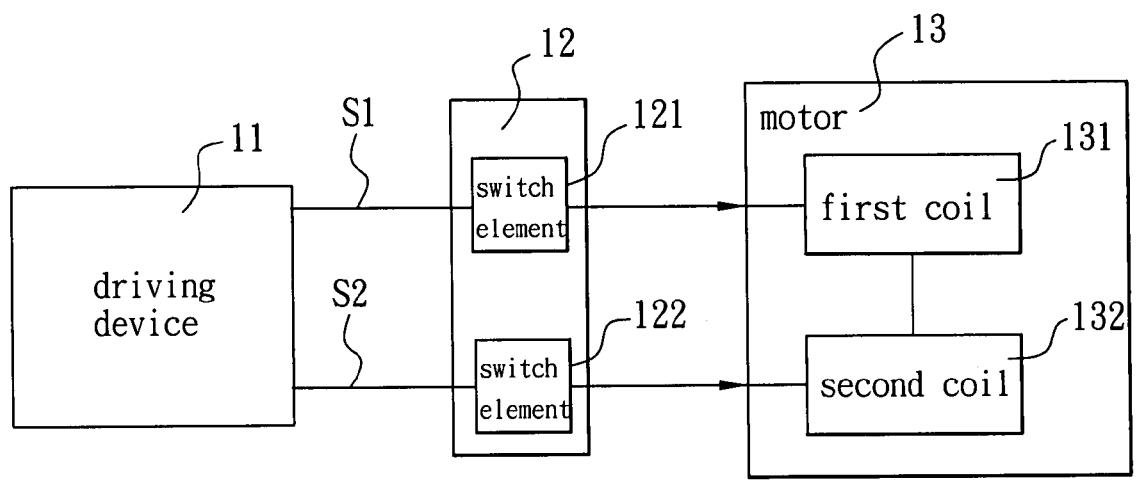
FIG. 1 is a schematic illustration showing a conventional fan system.
Figure 2:
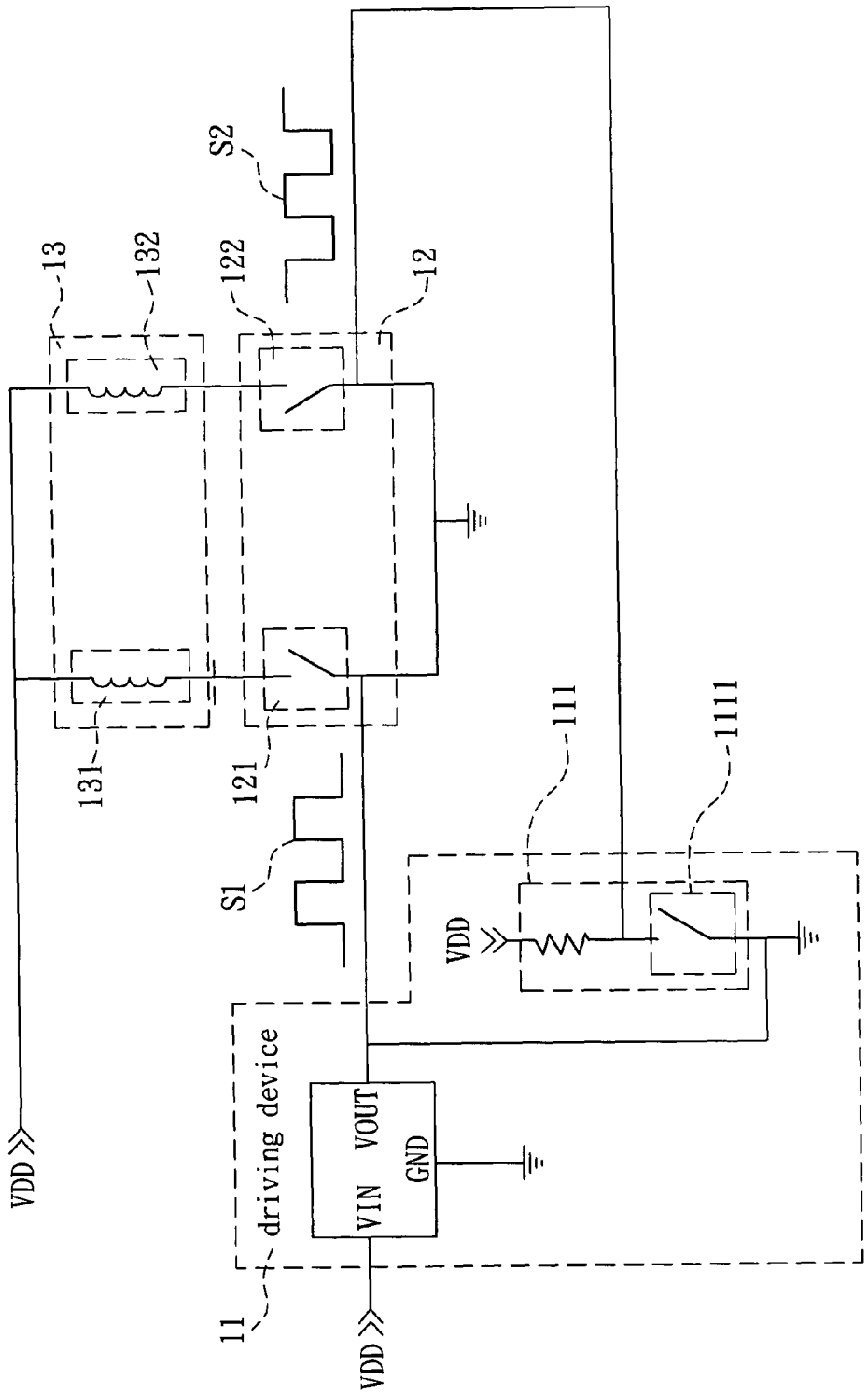
FIG. 2 shows an equivalent circuit diagram of the conventional fan system shown in FIG. 1.
Figure 3:
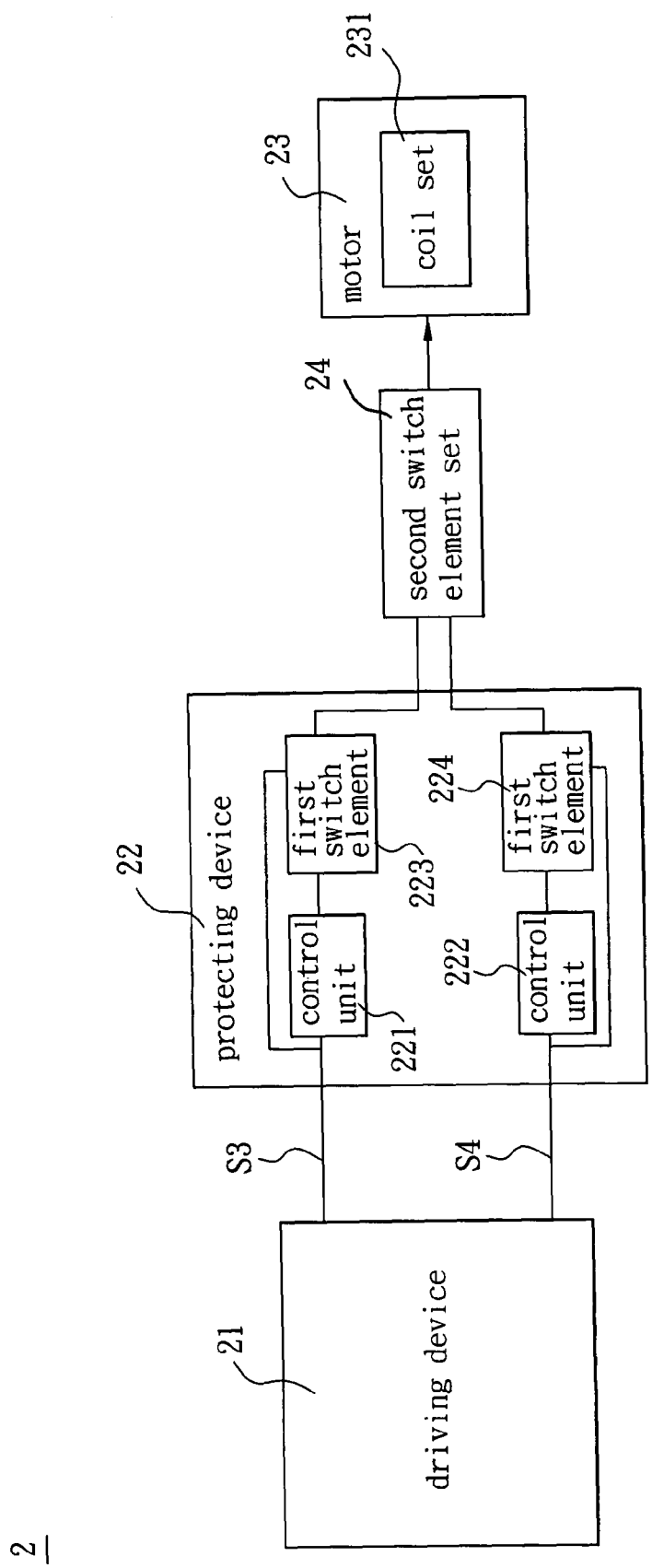
FIG. 3 is a schematic illustration showing a fan system and a protecting device according to an embodiment of the invention.

Referring to FIG. 3, a fan system 2 according to an embodiment of the invention includes a driving device 21, a protecting device 22 and a fan motor 23.

The driving device 21 generates a first input signal S3 and a second input signal S4. The first input signal S3 can be implemented as a Hall signal, which is generated by a Hall effect IC (not shown). The second input signal S4 is an inverse signal to the first input signal S3.

The motor 23 has a coil set 231 and a rotor structure (not shown), which is rotated by the electromagnetic induction with the coil set 231 so that the motor 23 rotates.

Figure 6A:
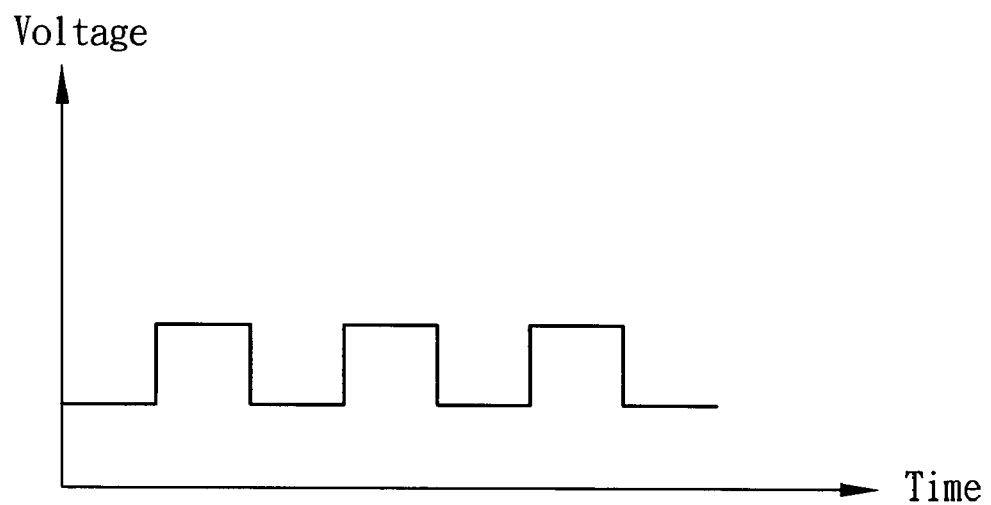
FIGS. 6A and 6B are schematic illustrations showing normal and abnormal waveforms of a first input signal according to the embodiment of the invention.

The protecting device 22 is electrically connected with the driving device 21 and the motor 23 and can be optionally disposed in the driving device 21 in implementation. The protecting device 22 has at least one first switch element and at least one control unit. Herein, the protecting device 22 has two control units 221 and 222 and two first switch elements 223 and 224, and each of the first switch elements 223 and 224 has an operation voltage VTH (see FIGS. 6C and 6D). The first switch elements 223 and 224 are electrically connected with the control units 221 and 222, respectively, for receiving the first and second input signals S3, S4. Then, the two control units 221 and 222 control the first switch elements 223 and 224 to turn on or turn off according to the first input signal S3 and the second input signal S4, respectively. The first switch elements 223 and 224 of this embodiment are not particularly restricted, and can be implemented as a MOS transistor or a BJT transistor.

Referring again to FIG. 3, the fan system 2 further includes at least one second switch element set 24 disposed between the coil set 231 and the protecting device 22. When the motor 23 has a full-bridge circuit layout, the coil set 231 includes at least one coil and the second switch element set 24 correspondingly has at least four second switch elements. Alternatively, when the motor 23 is a half-bridge circuit layout, the coil set 231 includes at least two coils and the second switch element set 24 correspondingly has at least two second switch elements. Alternately turning on/off each of the second switch elements makes the current flow through the coils alternately so that the motor 23 can rotate.

Figure 4:
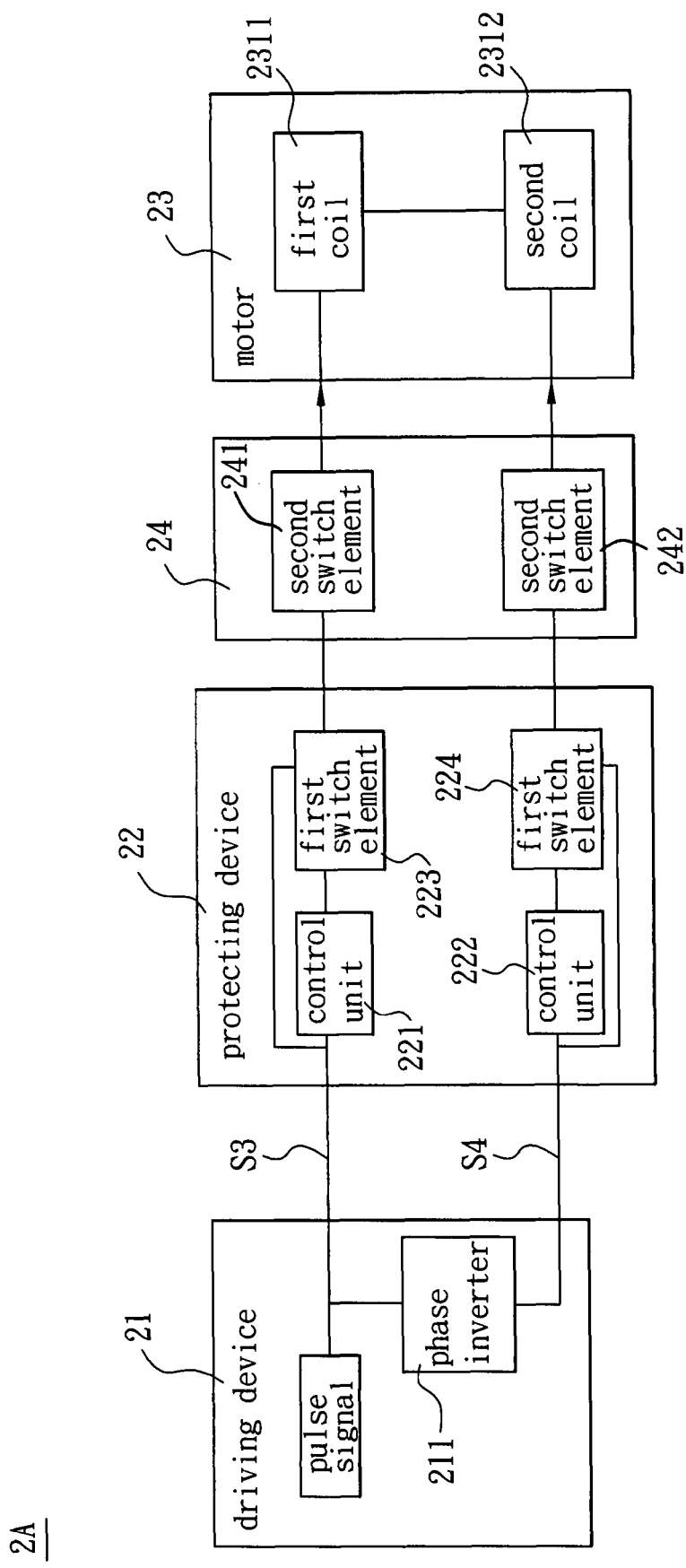
FIG. 4 is a schematic illustration showing a motor implemented with a half-bridge circuit layout according to the embodiment of the invention.
Figure 5:
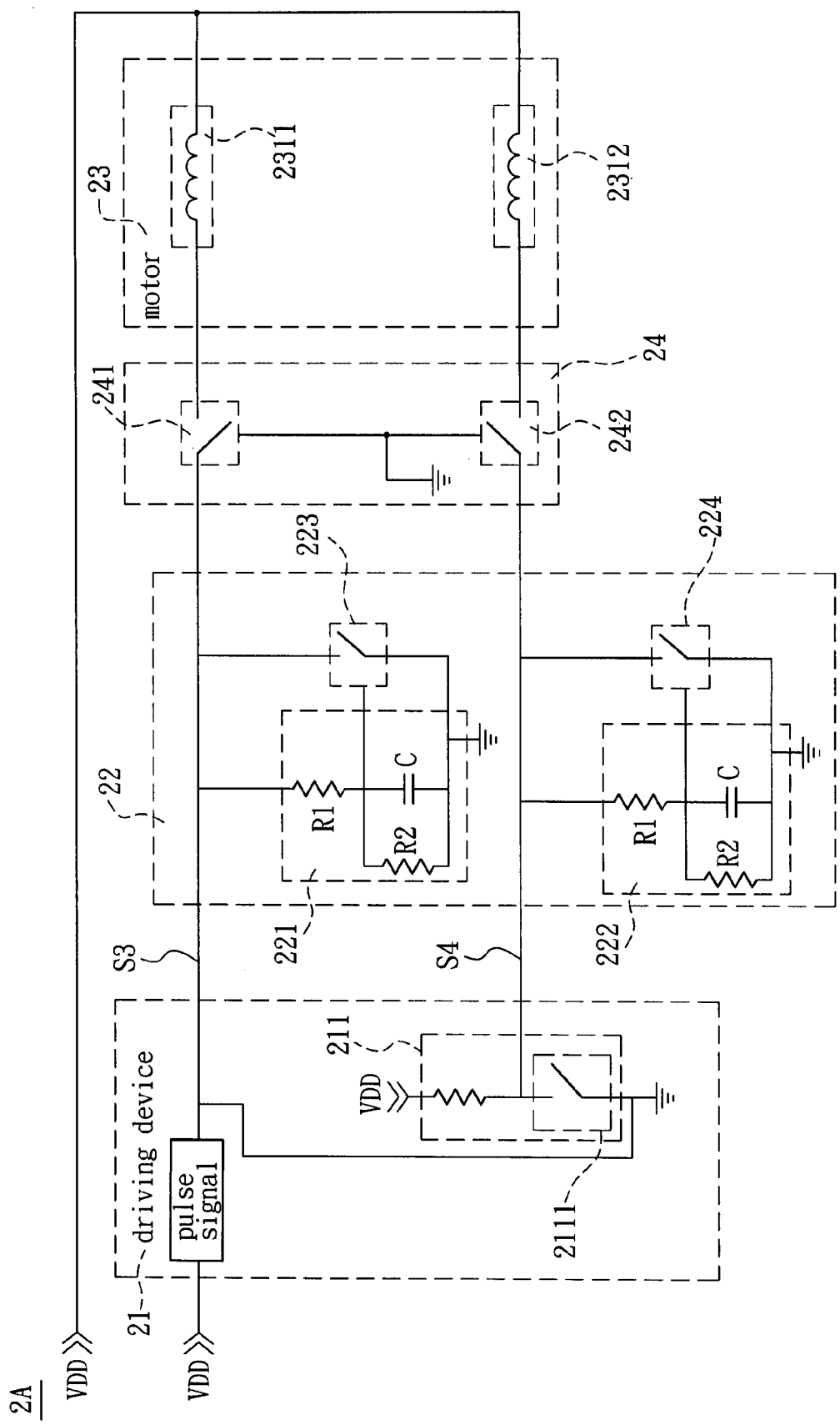
FIG. 5 shows an equivalent circuit diagram of the embodiment shown in FIG. 4.

Please refer to FIGS. 4 and 5, wherein FIG. 4 shows a fan system 2A according to the embodiment of the invention, and FIG. 5 shows an equivalent circuit diagram of the fan system 2A shown in FIG. 4. Herein, the motor 23 is implemented as having the half-bridge circuit layout. Thus, the coil set of the motor 23 includes a first coil 2311 and a second coil 2312, and the second switch element set 24 correspondingly includes two second switch elements 241 and 242.

As shown in FIGS. 4 and 5, the driving device 21 can invert the first input signal S3 into the second input signal S4 using a phase inverter 211 and a switch element 2111.

Referring again to FIG. 5, each of the control units 221 and 222 includes a first resistor R1, a capacitor C and a second resistor R2. Illustrations will be made hereinafter by taking the control unit 221 as an example. The first resistor R1 has a first terminal, which is electrically connected with a first terminal of the first switch element 223 and the first coil 2311, and receives the first input signal S3. The capacitor C has a first terminal and a second terminal. The first terminal of the capacitor C is electrically connected with a second terminal of the first resistor R1 and a second terminal of the first switch element 223. The second terminal of the capacitor C is electrically connected with a third terminal of the first switch element 223 and grounded. The second resistor R2 has a first terminal electrically connected with the one terminal of the capacitor C, and a second terminal grounded. The first resistor R1 and the second resistor R2 of this embodiment divide the voltage of the first input signal S3, and the capacitor C for charge/discharge has a saturation voltage VRC (see FIGS. 6C and 6D), which is higher than the operation voltage VTH. The control units 222 and 221 have the same structure and the same function, but the connection of the control unit 222 differs from that of the control unit 221 in that the control unit 222 receives the second input signal S4 and is electrically connected with the second coil 2312.

Figure 6B:
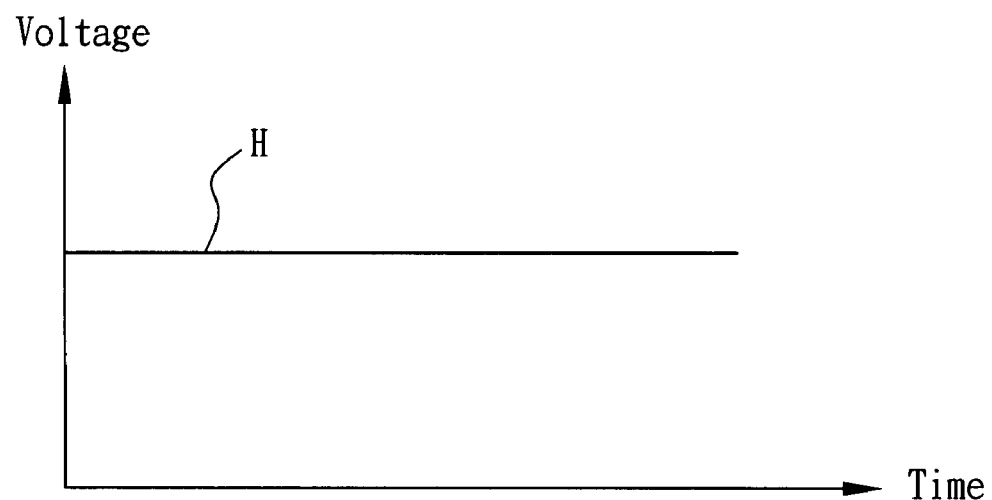
Figure 6C:
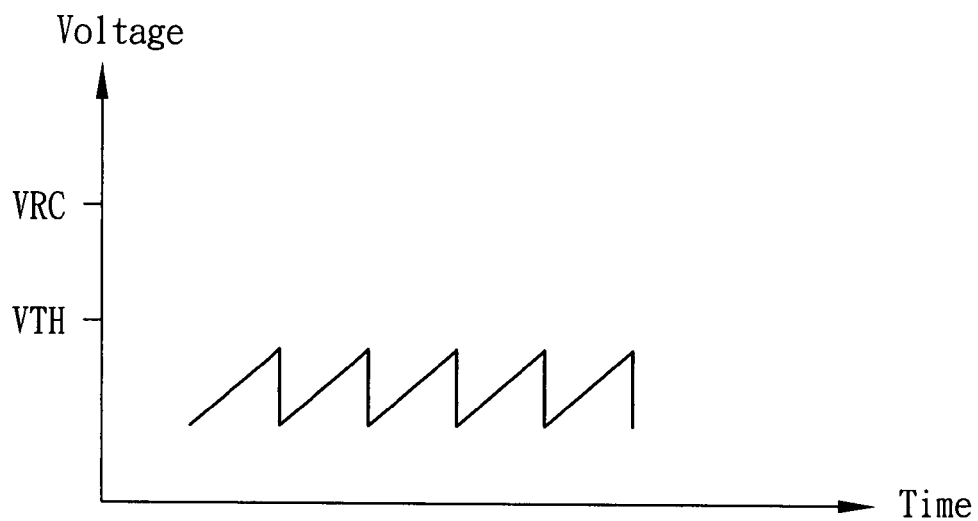
FIGS. 6C and 6D are schematic illustrations showing normal and abnormal charge/discharge conditions of a capacitor according to the embodiment of the invention.
Figure 6D:
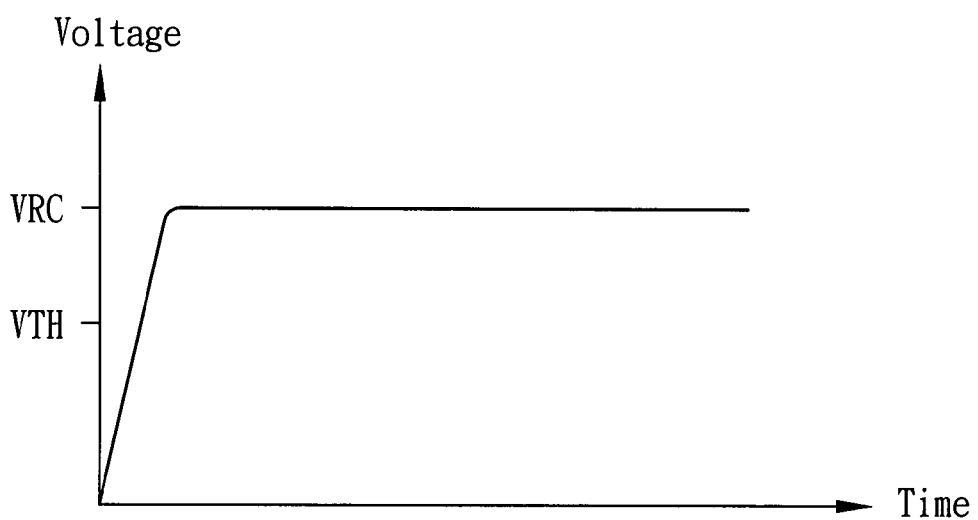

The fan system 2A operates as follows. The driving device 21 generates the first input signal S3, which is inverted by the phase inverter 211 into the second input signal S4. At this time, the first and second input signals S3, S4 are continuously inputted pulse signals (see FIG. 6A). The control units 221 and 222 and the first switch elements 223 and 224 of the protecting device 22 receive the first and second input signals S3, S4, respectively, and continuously charge or discharge the capacitor C, as shown in FIG. 6C. Because the capacitor C does not reach the saturation voltage VRC and has the voltage lower than the operation voltage VTH of the first switch elements 223 and 224, the control units 221 and 222 respectively control the first switch elements 223 and 224 to turn off. In addition, the first and second input signals S3, S4 can be respectively transferred to the second switch elements 241 and 242 of the second switch element set 24 so that the second switch elements 241 and 242 turn on or turn off according to the first and second input signals S3, S4, respectively, to control the first coil 2311 or the second coil 2312 of the motor 23 to produce the induction and thus rotate the rotor structure. When the fan system 2A is influenced by the external forces or the internal element is loosen to jam and stop the rotor, the driving device 21 makes the first input signal S3 or the second input signal S4 be a high-potential signal H (as shown in FIG. 6B), which is transferred to the protecting device 22. At this time, the first input signal S3 or the second input signal S4 charges the capacitor C to the saturation state, and thus makes the capacitor C be open circuited. Herein, the output generated after the first resistor R1 and the second resistor R2 have divided the voltage is higher than the operation voltage VTH (see FIG. 6D). Therefore, the control units 221 and 222 respectively make the first switch elements 223 and 224 turn on and be grounded, while grounding the high-potential signal H. The control units 221 and 222 stop outputting the first and second input signals S3, S4. After the abnormal or jammed condition of the rotor is eliminated, the first input signal S3 and the second input signal S4 recover to the pulse signals, and the saturation voltage VRC is discharged through the first resistor R1 and the second resistor R2. Accordingly, the motor 23 can recover to the normal operation.

Because the fan system 2A receives the first and second input signals S3, S4 through the control units 221 and 222 and the first switch elements 223 and 224 of the protecting device 22, respectively, and then controls the first switch elements 223 and 224 to turn on or turn off using the control units 221 and 222, respectively, it is possible to start outputting or stop outputting the first input signal S3 or the second input signal S4.

It is to be supplemented that the motor 23 of the invention is not restricted to the half-bridge circuit layout of FIGS. 4 and 5, and the motor can be implemented as having the full-bridge circuit layout. The difference between the full-bridge and half-bridge circuit layouts resides in the winding numbers and the numbers of the second switch elements. However, the full-bridge and half-bridge circuit layouts have the same technology of protecting the motor, so detailed descriptions thereof will be omitted and no drawing will be illustrated.

In summary, at least one control unit controls at least one first switch element to turn on or turn off according to a first input signal in the fan system and protecting device of the invention. The control unit stops outputting the first input signal to protect the motor when the first switch element turns on. Alternatively, the control unit outputs the first input signal to control the motor to rotate when the first switch element turns off. Compared with the prior art, the protecting device of the invention can control the first switch element to turn on when the motor gets abnormal or stops so that the first input signal is grounded and cannot be outputted to the motor. Thus, it is possible to prevent the motor from being overheated and thus damaged or burn out without decreasing the reliability and the lifetime of the fan system.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A protecting device of a fan system, comprising:
two first switch elements for receiving a first input signal and a second input signal respectively, and the second input signal has a phase opposite to that of the first input signal; and
two control units electrically connected with the first switch elements respectively for receiving the first input signal and the second input signal, and controlling the first switch elements to turn on or turn off according to the first input signal and the second input signal respectively,
wherein the control units stop outputting the first input signal and the second input signal when the first switch elements turn on, and the control units output the first input signal and the second input signal when the first switch elements turn off so that a fan of the fan system is driven by the first input signal and the second input signal.

2. The protecting device according to claim 1, wherein the first input signal is a Hall signal.

3. The protecting device according to claim 1, wherein the phase inverter comprises at least one switch element.

4. The protecting device according to claim 1, wherein the first switch element turns on when the first input signal is a continuous high-potential signal.

5. The protecting device according to claim 1, wherein the first switch element is a MOS transistor or a BJT transistor.

6. The protecting device according to claim 1, wherein the control unit comprises:
a first resistor having a first terminal electrically connected with a first terminal of the first switch element for receiving the first input signal;
a capacitor having a first terminal electrically connected with a second terminal of the first resistor and a second terminal of the first switch element, and a second terminal electrically connected with a third terminal of the first switch element and grounded; and
a second resistor having a first terminal electrically connected with the first terminal of the capacitor, and a second terminal grounded.

7. A fan system comprising:
a driving device for generating a first input signal and a second input signal with a phase opposite to that of the first input signal;
a protecting device electrically connected with the driving device and having two first switch elements and two control units, wherein the first switch elements receive the first input signal and the second input signal, and the control units are electrically connected with the first switch elements, receive the first input signal and the second input signal, and control the first switch elements to turn on or turn off according to the first input signal and the second input signal respectively; and
a fan motor electrically connected with the protecting device;
wherein the control units stop outputting the first input signal and the second input signal when the first switch elements turn on, and the control unit output the first input signal and the second input signal to control the motor to rotate when the first switch elements turn off.

8. The fan system according to claim 7, wherein the fan motor comprises a coil set.

9. The fan system according to claim 8, wherein the first switch element turns on when the first input signal is a continuous high-potential signal.

10. The fan system according to claim 7, wherein the first input signal is a Hall signal.

11. The fan system according to claim 10, further comprising at least one second switch element disposed between the coil set and the protecting device.

12. The fan system according to claim 11, wherein when the motor has a half-bridge circuit layout, the coil set comprises at least two coils, and the fan system correspondingly has two second switch elements.

13. The fan system according to claim 11, wherein when the motor has a full-bridge circuit layout, the coil set comprises at least one coil, and the fan system correspondingly has at least four second switch elements.

14. The fan system according to claim 7, wherein the phase inverter comprises at least one switch element.

15. The fan system according to claim 7, wherein the first switch element is a MOS transistor or a BJT transistor.

16. The fan system according to claim 7, wherein the control unit comprises:
a first resistor having a first terminal electrically connected with a first terminal of the first switch element for receiving the first input signal;
a capacitor having a first terminal electrically connected with a second terminal of the first resistor and a second terminal of the first switch element, and a second terminal electrically connected with a third terminal of the first switch element and grounded; and
a second resistor having a first terminal electrically connected with the first terminal of the capacitor, and a second terminal grounded.

* * * * *